Patented June 1, 1926.

1,587,323

UNITED STATES PATENT OFFICE.

CHARLES B. JACOBS, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF EFFECTING THERMOCHEMICAL REACTIONS.

No Drawing. Application filed November 27, 1929. Serial No. 426,863.

This invention relates to processes involving thermo-chemical reactions in which the element carbon is an active constituent of the reacting materials by virtue of its power to combine with the other reacting elements to form either volatile or non-volatile chemical compounds. The invention pertains especially to processes of the above character in which it is essential that the carbon constituent of the reacting materials be particularly adapted for the process reactions by reason of its purity and chemical activity.

In my pending application, Serial No. 309,920, filed July 10, 1919, process effecting chemical reactions with by-product carbon from cellulose purification, I described the activity of carbon obtained through the incineration of the black liquor resulting from treatment of various fibers for the purification of their contained cellulose. I also described the method of obtaining this black liquor by the cooking of wood, straw, or various similar fibers with caustic soda solutions in the production of pulp for the manufacture of paper. I outlined the usual method of incinerating black liquor in rotary furnaces where, at the expense of a part of the contained carbon, the water is evaporated and a black ash results containing substantially 85 to 90% of sodium carbonate and 15 to 10% of carbon.

In my previous application mentioned above, I stated that the discovery of this form of carbon constituted a desideratum for thermo-chemical reactions which involve carbon as a reactive element. I gave examples of the application of this form of carbon to thermo-chemical reactions and specifically related its application in the production of alkali-metal cyanides as described in my applications Serial No. 279,801 and Serial No. 279,802, filed February 28, 1919,—the following equation expressing the generally accepted reaction involved:

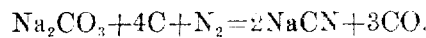

$$Na_2CO_3 + 4C + N_2 = 2NaCN + 3CO.$$

This process of producing alkali-metal cyanides, stated generically, comprises heating in contact with nitrogen a mixture containing an alkali metal halide, a compound of an alkali-metal other than a halide, as for example an alkali-metal carbonate or hydroxide, and carbon obtained as a by-product in cellulose purification, with or without a reducible compound of a carbide or nitride-forming metal such as iron, to a temperature sufficient to effect a reaction between the carbon, the nitrogen and the alkali-metal carbonate or hydroxide, to form an alkali-metal cyanide. Typical examples of the process of making alkali-metal cyanides involving the application of this highly reactive carbon were cited with sodium chloride or sodium fluoride as the chief accelerating agent present, and also with iron oxide used in conjunction with sodium chloride or sodium fluoride as the accelerating agents. These examples showed that the substitution of an equal weight of this highly reactive carbon for the ordinary carbon previously used, resulted in the conversion to sodium cyanide of from 95 to 98% of the sodium carbonate present in the charge in approximately one-half the time required to convert 75 to 85% of the sodium carbonate to sodium cyanide when the ordinary form of carbon was used, —the operations being carried out under otherwise identical conditions.

In the ordinary process of recovering the soda compounds from paper pulp mill black liquor, this liquor, after evaporation to about 35° Bé., is fed into incinerators, usually of the rotary type, where at the expense of a part of the contained carbon, the water is evaporated and a black ash results containing substantially 85–90% sodium carbonate and 15–10% carbon, the mass in the incinerator becoming heated to a red heat, that is to a temperature above 550° C., during the operation. I have found upon further investigation that if, instead of incinerating the black liquor by this usual method, whereby the residue becomes heated to such a high temperature, it be evaporated to dryness at comparatively low temperatures, i. e. below a red heat and preferably at about 200–300° C., there results the usual recovery of soda ash with an increased yield of carbon. The final residue contains sodium compounds equivalent to 60–65% soda ash, and 40–35% carbon. The carbon, when obtained in this condition, is much more active than that obtained by incineration at the higher temperature, and thus, in addition to obtaining the same amount of soda ash for return to the pulp process, there is obtained a larger proportion of carbon of much greater chemical activity. The soluble sodium salts may be leached away from this carbon in the usual manner and the carbon filtered and dried for use in thermo-chemical reactions in general, and for use as a catalyzer for promoting gas reactions, and as a decolorizing agent. These latter uses, as well as the use of this carbon in the thermo-chemical reaction involving the production of metallic sodium, are fully described and claimed in my copending application, (Case 9) Serial No. 426,864, filed coincidently with this.

The new carbon produced in the above described manner, either before or after removal of soda ash, may be referred to as carbon obtainable by thermally decomposing the alkali-soluble constituents of wood at a temperature below 550° C., and by this expression I mean to include carbon derived in like manner from cotton, esparto, straw, and equivalent vegetable fibers.

The organic constituents of wood which are dissolved by the alkali used in the "soda process", include certain forms of cellulose which are soluble in sodium hydroxide solution, and various resins. The proportion of cellulose soluble in sodium hydroxide solution, and of resins, varies considerably in different kinds of wood. The sodium hydroxide-soluble cellulose is usually present in substantial proportions; the carbon obtained from wood in the above-described manner may therefore be said to consist essentially of alkali-soluble-cellulose carbon and alkali-soluble-wood-resin carbon. The alkali-soluble form (i. e. the beta and gamma forms) of cellulose, also exists to some extent in cellulosic substances such as cotton, esparto, straw, etc; the carbon obtained from the alkali-soluble constituents of wood and other crude cellulose of this kind may be referred to generically as alkali-soluble-cellulose carbon.

On account of the extreme affinity of this form of carbon for oxygen (even at comparatively low temperatures, as fully described in the copending application mentioned above), it is desirable in evaporating the black liquor to carry out the operation in the absence of air, i. e. in closed pans or pots, and to cool the resultant mixture of carbon and sodium compounds to below 80° C., and preferably to room temperature, before exposing it to the action of air.

In cases where the thermo-chemical reactions involve the use of sodium compounds, especially in the form of soda ash, the residue from the evaporation described above may be utilized directly, providing the proportions of soda ash and carbon in the charge required for the particular reaction, correspond substantially with those present in the evaporated residue. Where the charge is to contain other constituents or other proportions of soda ash and carbon, the evaporated residue may be used as the basis for building up the charge; as for instance, in the production of alkali-metal cyanides in accordance with my pending applications, Serial No. 279,801, filed February 28th, 1919, and also Serial No. 279,802, filed on the same date. In these particular cases, it is, however, unnecessary to evaporate the black liquor to dryness before adding the other constituents of the charge.

Paper pulp mill black liquor, as it is usually produced and evaporated to a concentration of about 35° Bé., preparatory to the usual method of incineration, contains approximately 56% water and about 44% potential soda ash and carbon, the latter percentage in the proportions of about 60–65 parts of soda ash to 40–35 parts of carbon. In constructing the preferred charge for the production of alkali-metal cyanides in accordance with the above-mentioned specifications,—for example, as described in application Serial No. 279,802, where iron oxide and alkali-metal halides are used in conjunction as the accelerating agents or catalyzers in the production of alkali-metal cyanide,—it is only necessary to add to this black liquor the necessary catalyzers, and to evaporate the whole mass to dryness preferably with exclusion of air at temperatures below 550° C. (for example about 300° C). Thus, for example, a charge composed of 440 lbs. of black liquor (at 35° Bé., the usual strength), 50 lbs. of oxide of iron, and 5 lbs. of sodium fluoride, yields on evaporation under the above conditions, a furnace charge of substantially the following composition:

|  | Per cent. |
|---|---|
| Sodium carbonate | 46 |
| By-product carbon | 37 |
| Iron oxide | 20 |
| Sodium fluoride | 2 |

The charge made up as above described is placed in a suitable retort, connected with a nitrogen supply, and subjected to a temperature of from 900° to 950° C., preferably under a nitrogen pressure of about 23 to 30 lbs. absolute. There results a furnace product having a sodium cyanide content of about 50–55%, which is equivalent to a conversion to sodium cyanide of about 95 to 98% of the sodium carbonate present, as compared with a sodium cyanide content of about 40–45% when carbon obtained by incineration of the black liquor at a red heat is used in place of the carbon obtained by evaporation of the black liquor at low temperatures. The higher result is, moreover, obtained in about 30% less time than is required when carbon obtained by incineration of black liquor at higher temperatures is used in the making up of the charge.

The 10% higher sodium cyanide content in the furnace product may be explained as follows: When using this more chemically active form of carbon obtained by the decomposition of black liquor at low temperatures, it is possible to carry a higher proportion of sodium carbonate in the furnace charge for the production of alkali metal cyanides than when using the old form of carbon. When using the carbon obtained by the ordinary method of incinerating black liquor at higher temperatures, the maximum amount of sodium carbonate it is advisable to carry in the furnace charge is about 40% of the weight of the charge, while in the example cited above 46% of the weight of the charge was composed of sodium carbonate. Since, substantially the same conversion of sodium carbonate to sodium cyanide was obtained with the 46% charge in 30% less furnacing time than was required by the 40% charge, the weight of cyanide produced per furnace hour and per pound of charge furnaced was very materially increased.

To illustrate how the proportions of several ingredients may be varied, the following example is given of the composition of the furnace charge:

|  | Parts. |
|---|---|
| Sodium carbonate | 46 |
| Carbon (reactive) | 35 to 45 |
| Alkali-metal halide | 1 to 10 |
| Iron oxide | 35 to 15 |

Although the carbons described in my copending applications Ser. No. 309920 and 312610 and in the present case are both highly reactive, the latter may be distinguished from the former by the lower temperature at which carbonization is effected, and by the lower ignition temperature in air of the new carbon, this temperature for the majority of samples being below 90° C., whereas the ignition temperature of the carbon described in the above mentioned applications is as a rule above 90° C.

The advantages and improvements in the art attained by the substitution of this particular form of carbon, and consisting in material increase in yield and distinct shortening of the time required for the completion of the reaction, will be readily appreciated by those familiar with the art. Further, I have found the application of this form of carbon to thermo-chemical operations differing in many ways from those mentioned above, to be advantageous. Thus, I may form it into briquettes with various other materials to carry out various thermochemical reactions; or I may make compositions of it with various inert materials to obtain an extended reaction surface of carbon for use as a catalyzer, as for example, in the manufacture of phosgene; or I may use it as a decolorizing agent; or I may employ it to carry out thermochemical reactions in which gases, vapors, or liquids are required to be brought into contact with large surface areas of chemically active carbon.

A further example of another specific application of this highly active form of carbon may be cited in the use of the potential soda ash and the active carbon contained in the residue obtained by evaporating black liquor at low temperatures, for the production of metallic sodium. If the above residue be enclosed in a suitable retort and heated to 800–950° C. or thereabouts, a rapid reduction of the sodium compounds to metallic sodium takes place, and the sodium distills off as vapor from the mouth of the retort, the reaction involved probably being as follows:

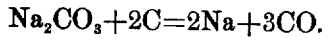

$$Na_2CO_3 + 2C = 2Na + 3CO.$$

Usually this reaction does not take place to any extent except at quite elevated temperatures (in the region of 1050–1150° C.) and rapidly only at still higher temperatures. The extreme activity of the carbon obtained from black liquor evaporated to dryness at low temperatures, and its very intimate contact with the sodium salts present with it during the evaporation, permits this reaction to take place at unusually low temperatures, thus making it possible to carry out the operation of the production of metallic sodium from sodium compounds by direct reduction with carbon, without undue deterioration of the retorts. It is well known to those versed in the art that the direct reduction of sodium compounds by carbon has not been successful commercially on account of the extremely high temperature required, and the consequent wear and tear on the apparatus.

I claim:—

1. The process of decomposing an oxygen-containing metal compound which comprises subjecting to a high temperature a mixture containing said metal compound and alkali-soluble-cellulose carbon having an ignition temperature below 90° C. in air.

2. The process of decomposing an oxygen-containing metal compound which comprises subjecting to a high temperature with exclusion of gaseous oxygen a mixture containing said metal compound and alkali-soluble-cellulose carbon having an ignition temperature below 90° C. in air.

3. The process of separating oxygen from a substance containing chemically bound oxygen which comprises heating said substance to a high temperature in contact with alkali-soluble-cellulose carbon having an ignition temperature below 90° C. in air.

4. The process of separating oxygen from a substance containing chemically bound oxygen which comprises heating said substance to a high temperature in contact with carbon obtainable by thermally decomposing the alkali-soluble constituents of wood at a temperature below 550° C.

5. The process of effecting reactions between a substance whose molecule contains oxygen and a substance whose molecule does not contain oxygen which comprises bringing said substance in contact with highly heated alkali-soluble-cellulose carbon having an ignition temperature below 90° C. in air.

6. The process of effecting reactions between nitrogen and an oxygen-containing compound of an alkali-forming metal which comprises bringing nitrogen in contact with a mixture comprising said oxygen-containing alkali-forming metal compound and alkali-soluble-cellulose carbon having an ignition temperature below 90° C. while maintaining said mixture at a high temperature.

7. The process of effecting reactions between nitrogen and an oxygen-containing compound of an alkali-forming metal which comprises bringing nitrogen in contact with a mixture comprising said oxygen containing alkali-forming metal compound, an alkali-metal halide, and alkali-soluble-cellulose carbon having an ignition temperature below 90° C. while maintaining said mixture at a high temperature.

8. The process of effecting reactions between nitrogen and an alkali-metal carbonate which comprises bringing nitrogen in contact with a mixture comprising said alkali-metal carbonate, an alkali-metal halide, and alkali-soluble-cellulose carbon having an ignition temperature beow 90° C. while maintaining said mixture at a high temperature.

9. The process of effecting reactions between nitrogen and an alkali-metal carbonate which comprises bringing nitrogen in contact with a mixture comprising said alkali-metal carbonate, an alkali-metal halide, and carbon obtainable by thermally decomposing at a temperature below 550° C. the alkali-soluble constituents of wood, while maintaining said mixture at a high temperature.

10. The process of effecting reactions between nitrogen and an oxygen-containing compound of an alkali-forming metal which comprises briging nitrogen in contact with a mixture comprising said oxygen containing alkali-forming metal compound, a finely divided substance comprising iron, an alkali-metal halide, and alkali-soluble-cellulose carbon having an ignition temperature below 90° C. while maintaining said mixture at a high temperature.

11. The process of producing an alkali-metal cyanide which comprises heating in contact with nitrogen a mixture containing an alkali-metal halide, a reducible compound of a carbide-forming metal, a compound of an alkali-metal other than a halide, and alkali-soluble-cellulose carbon having an ignition temperature below 90° C., to a temperature sufficient to effect a reaction between the carbon, nitrogen, and the last mentioned alkali-metal compound to form an alkali-metal cyanide.

12. The process of making sodium cyanide which comprises heating in contact with nitrogen a mixture containing a sodium halide, iron oxide, sodium carbonate, and alkali-soluble-cellulose carbon having an ignition temperature below 90° C., to a temperature sufficient to effect a reaction between the carbon, nitrogen, and the sodium carbonate to form sodium cyanide.

13. The process of producing an alkali-metal cyanide which comprises heating in contact with nitrogen a mixture containing an alkali-metal halide, a reducible compound of a carbide-forming metal, a compound of an alkali-metal other than a halide, and carbon obtainable by thermally decomposing at a temperature below 550° C. the alkali-soluble constituents of wood, to a temperature sufficient to effect a reaction between the carbon, nitrogen, and the last mentioned alkali-metal compound to form an alkali-metal cyanide.

14. The process of making sodium cyanide, which comprises heating in contact with a nitrogen-bearing gas a mixture containing sodium fluoride, a reducible compound of a carbide-forming metal, sodium carbonate, and carbon obtainable by thermally decomposing at a temperature between 200 and 350° C. the alkali-soluble constituents of wood, to a temperature sufficient to effect a reaction between the nitrogen, carbon and sodium carbonate to form sodium cyanide.

15. The process of making an alkali-metal cyanide, which comprises heating in contact with a nitrogen-bearing gas a mixture containing an alkali-metal halide, a finely divided substance comprising iron, a compound of an alkali-metal other than a halide, and carbon obtainable by thermally decomposing at a temperature between 200 and 350° C. the alkali-soluble constituents of wood, to a temperature sufficient to effect a reaction between the carbon, nitrogen and the alkali-metal compound to form an alkali-metal cyanide.

16. The process of making an alkali-metal cyanide, which comprises making a mixture containing an alkali-metal halide, a reducible compound of a carbide-forming metal, a compound of an alkali-metal other than a halide, and carbon obtainable by thermally decomposing at a temperature below 550° C. the alkali-soluble constituents of wood, heating the mixture in a closed retort provided with an exit for the escape of gaseous products to a sufficient temperature to expel gaseous reduction products from the reducible compound of the carbide-forming metal to render the mixture porous, and subjecting the porous mixture to the action of nitrogen, at a temperature sufficient to effect a reaction between the carbon, nitrogen and the alkali-metal compound to form an alkali-metal cyanide.

17. The process of making an alkali-metal cyanide, which comprises making a mixture of an alkali-metal halide, oxide of iron, a compound of an alkali-metal other than a halide, and carbon obtainable by thermally decomposing at a temperature between 200 and 350° C. the alkali-soluble constituents of wood, heating the mixture in a closed retort provided with an exit for the escape of gaseous products to a sufficient temperature to expel gaseous reduction products from the oxide of iron to render the mixture porous, and subjecting the porous mixture to the action of a nitrogen-bearing gas, at a temperature sufficient to effect a reaction between the carbon, nitrogen and the alkali-metal compound to form an alkali-metal cyanide.

18. The process of making an alkali-metal cyanide, which comprises making a mixture of an alkali-metal halide, a reducible compound of a carbide-forming metal, a compound of an alkali-metal other than a halide, and carbon obtainable by thermally decomposing at a temperature below 550° C. the alkali-soluble constituents of wood, heating the mixture in a closed retort provided with an exit for the escape of gaseous products to a temperature of from about 850 to 950° C., and subjecting the heated mixture to the action of nitrogen, substantially as described.

19. The process of making an alkali-metal cyanide, which comprises passing nitrogen gas under an absolute pressure of from about 23 to 35 pounds per square inch in contact with a mixture containing an alkali-metal halide, a reducible compound of a carbide-forming metal, a compound of an alkali-metal other than a halide, and carbon obtainable by thermally decomposing at a temperature below 550° C. the alkali-soluble constituents of wood, while maintaining said mixture at a temperature sufficient to effect a reaction between the carbon, nitrogen and alkali-metal compound to form an alkali-metal cyanide.

20. The process of making a sodium cyanide which comprises heating in contact with nitrogen a mixture containing from 1 to 10 parts of an alkali-metal halide, from 35 to 15 parts of iron oxide, about 46 parts of sodium carbonate and from 35 to 45 parts of carbon obtainable by thermally decomposing at a temperature below 550° C. the alkali-soluble constituents of wood, to a temperature sufficient to effect a reaction between the carbon, nitrogen and the sodium carbonate to form sodium cyanide.

21. The process of effecting reactions between nitrogen and an alkali-metal carbonate which comprises heating a mixture containing alkali-soluble cellulose, and alkali-metal compound, water, and iron oxide to a temperature below 550° C. but high enough to evaporate the water and to carbonize the cellulose, and then bringing nitrogen in contact with the resulting mass at a high temperature.

22. The process of effecting reactions between nitrogen and an alkali-metal carbonate which comprises heating a mixture containing alkali-soluble cellulose, an alkali-metal compound, water and iron oxide to a temperature below 550° C. but high enough to evaporate the water and to carbonize the cellulose, and then bringing nitrogen under pressure in contact with the resulting mass at a temperature of from about 850 to 950° C.

23. The process of effecting reactions between nitrogen and sodium carbonate which comprises heating with exclusion of air a mixture containing alkali-soluble cellulose, a sodium compound, water, and iron oxide to a temperature below 550° C. but high enough to evaporate the water and to carbonize the cellulose, and then bringing nitrogen in contact with the resulting mass at a high temperature.

24. The process of effecting reactions between nitrogen and sodium carbonate which comprises heating with exclusion of air a mixture containing alkali-soluble cellulose, a sodium compound, water, and iron oxide to a temperature below 550° C. but high enough to evaporate the water and to carbonize the cellulose, and then bringing nitrogen in contact with the resulting mass at a temperature of from about 850 to 950° C.

25. The process of producing an alkali-metal cyanide which comprises incorporating iron oxide in soda pulp black liquor, evaporating the mixture to dryness, and then subjecting it to the action of nitrogen at a high temperature.

26. The process of producing an alkali-metal cyanide which comprises incorporating iron oxide in soda pulp black liquor, evaporating the mixture to dryness at a temperature between 200 and 550° C. while excluding air therefrom, and then subjecting the dry mass at a temperature of from about 850 to 950° C. to the action of nitrogen.

27. The process of producing an alkali-metal cyanide which comprises incorporating a reducible compound of a carbide-forming metal in soda pulp black liquor, evaporating the mixture to dryness at a temperature between 200 and 550° C. while excluding air therefrom, and then subjecting the dry mass at a temperature of from about 850 to 950° C. to the action of nitrogen.

28. The process of producing an alkali-metal cyanide which comprises incorporating a reducible compound of a carbide-forming metal and an alkali-metal halide in soda pulp black liquor, evaporating the mixture to dryness at a temperature between 200 and 550° C. while excluding air therefrom, and then subjecting the dry mass at a temperature of from about 850 to 950° C. to the action of nitrogen.

29. The process of producing an alkali-metal cyanide which comprises incorporating a finely divided substance comprising iron and an alkali-metal halide in soda pulp black liquor, evaporating the mixture to dryness at a temperature between 200 and 550° C. while excluding air therefrom, and then subjecting the dry mass at a temperature of from about 850 to 950° C. to the action of nitrogen.

In testimony whereof I affix my signature.

CHARLES B. JACOBS.

ing the dry mass at a temperature of from about 850 to 950° C. to the action of nitrogen.

28. The process of producing an alkali-metal cyanide which comprises incorporating a reducible compound of a carbide-forming metal and an alkali-metal halide in soda pulp black liquor, evaporating the mixture to dryness at a temperature between 200 and 550° C. while excluding air therefrom, and then subjecting the dry mass at a temperature of from about 850 to 950° C. to the action of nitrogen.

29. The process of producing an alkali-metal cyanide which comprises incorporating a finely divided substance comprising iron and an alkali-metal halide in soda pulp black liquor, evaporating the mixture to dryness at a temperature between 200 and 550° C. while excluding air therefrom, and then subjecting the dry mass at a temperature of from about 850 to 950° C. to the action of nitrogen.

In testimony whereof I affix my signature.

CHARLES B. JACOBS.

CERTIFICATE OF CORRECTION.

Patent No. 1,587,323.     June 1, 1926.

CHARLES B. JACOBS.

It is hereby certified that error appears in the printed specification of the above numbered patent requiring correction as follows: In the heading to the printed specification, line 5, date of filing, for "November 27, 1929" read "November 27, 1920"; and that the said Letters Patent should be read with this correction therein that the same may conform to the record of the case in the Patent Office.

Signed and sealed this 16th day of May, A. D. 1933.

M. J. Moore.

(Seal)     Acting Commissioner of Patents.

CERTIFICATE OF CORRECTION.

Patent No. 1,587,323.                                                          June 1, 1926.

CHARLES B. JACOBS.

It is hereby certified that error appears in the printed specification of the above numbered patent requiring correction as follows: In the heading to the printed specification, line 5, date of filing, for "November 27, 1929" read "November 27, 1920"; and that the said Letters Patent should be read with this correction therein that the same may conform to the record of the case in the Patent Office.

Signed and sealed this 16th day of May, A. D. 1933.

M. J. Moore.

(Seal)                                      Acting Commissioner of Patents.